United States Patent
LeFevre et al.

(10) Patent No.: US 11,225,066 B2
(45) Date of Patent: Jan. 18, 2022

(54) IN-LINE DETECTION AND CORRECTION OF UNDERPERFORMING LIGHT EMITTING DIODES IN A CURING STATION OF A THREE DIMENSIONAL OBJECT PRINTER

(71) Applicant: Xerox Corporation, Norwalk, CT (US)

(72) Inventors: Jason Matthew LeFevre, Penfield, NY (US); Paul McConville, Webster, NY (US); Douglas K. Herrmann, Webster, NY (US); Seemit Praharaj, Webster, NY (US); Michael Jon Levy, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 403 days.

(21) Appl. No.: 15/473,199

(22) Filed: Mar. 29, 2017

(65) Prior Publication Data

US 2018/0281310 A1 Oct. 4, 2018

(51) Int. Cl.
  *B29C 64/112* (2017.01)
  *B33Y 10/00* (2015.01)
  *B33Y 30/00* (2015.01)
  *B33Y 50/02* (2015.01)
  *B29C 64/386* (2017.01)

(52) U.S. Cl.
  CPC ............ *B33Y 10/00* (2014.12); *B29C 64/112* (2017.08); *B29C 64/386* (2017.08); *B33Y 30/00* (2014.12); *B33Y 50/02* (2014.12)

(58) Field of Classification Search
  None
  See application file for complete search history.

(56) References Cited

U.S. PATENT DOCUMENTS

| | | | |
|---|---|---|---|
| 7,300,129 B2 | 11/2007 | Kumamoto et al. | |
| 7,766,473 B2 | 8/2010 | Hoshino | |
| 9,827,790 B1 | 11/2017 | Moore et al. | |
| 2003/0151656 A1 | 8/2003 | Kokubo et al. | |
| 2006/0201018 A1 | 9/2006 | McKay et al. | |
| 2006/0290760 A1 | 12/2006 | German et al. | |

(Continued)

OTHER PUBLICATIONS

Zeng ("Control of a Robotic UV curing process with thermal vision feedback through two IR cameras" Proceedings of the ASME 2009 International Mechanical Engineering Congress & Exposition, IMECE2009-13007, pp. 1-9) (Year: 2009).*

(Continued)

*Primary Examiner* — Joel G Horning

(57) ABSTRACT

A print system and a method for detecting and correcting underperforming LEDs in-line of a 3D object printer are disclosed. For example, the print system includes a plurality of printheads arranged in a two-dimensional array, a curing light source, an inline detection and correction (IDC) system, a movable member to hold an object and a test plate and a controller to control movement of the movable member to move the object and the test plate past the array of printheads, to operate the plurality of printheads to eject a marking material onto the object as the object passes the two-dimensional array of printheads, to operate the curing light source apply energy to the test plate and to cure the marking material, and to operate the IDC system to read the test plate to confirm that the curing light source is operating correctly based on a reading of the test plate.

9 Claims, 6 Drawing Sheets

(56) References Cited

U.S. PATENT DOCUMENTS

| | | |
|---|---|---|
| 2007/0058020 A1 | 3/2007 | Wetjens et al. |
| 2009/0207203 A1 | 8/2009 | Yamamoto |
| 2009/0231403 A1* | 9/2009 | Shi .................. B41J 11/0095 347/101 |
| 2010/0154244 A1* | 6/2010 | Kuta .................. F26B 3/28 34/275 |
| 2010/0192792 A1 | 8/2010 | Hall et al. |
| 2010/0328083 A1 | 12/2010 | Dillon |
| 2013/0044172 A1 | 2/2013 | Nakajima |
| 2014/0002557 A1 | 1/2014 | Condello et al. |
| 2014/0242346 A1* | 8/2014 | Nielsen ............ B21D 22/203 428/174 |
| 2015/0163880 A1 | 6/2015 | Sun et al. |
| 2015/0224680 A1 | 8/2015 | Oestergaard et al. |
| 2015/0231897 A1 | 8/2015 | Noell |

OTHER PUBLICATIONS

Detecting VOCs with PID—how it works. Crowcon Detection Instrucments LTD. May 7, 2015, Retrieved online Sep. 17, 2019.
Consolidated Label Company, "UPC Barcodes: What You Need to Know" Jan. 20, 2015.
Kay, "Using Multi-Zone Irradiance Control in UV LED Systems", ASI Adhesives & Sealant Industry, Oct. 1, 2015, 5 pages, Design, CMS, Hosting & Web Development:: e Publishing.

* cited by examiner

IN-LINE DETECTION AND CORRECTION OF UNDERPERFORMING LIGHT EMITTING DIODES IN A CURING STATION OF A THREE DIMENSIONAL OBJECT PRINTER

The present disclosure relates generally to curing systems and, more particularly, to an apparatus and method for detecting and correcting underperforming light emitting diodes (LEDs) in a curing station of a three dimensional (3D) object printer.

BACKGROUND

Some printers use UV curable inks to print on articles and objects. UV curable inks are applied onto the article or object and a UV light source is used to cure the ink. The UV light source may be used to initiate a photochemical reaction that generates a crosslinked network of polymers. In other words, the ink is not simply "dried" where solvent is evaporated from the ink. Rather, the UV ink is cured such that the polymers in the UV ink undergo a chemical reaction to link or bond to the article or object.

A curing light source may be used to applying light to cure the UV curable ink. However, if curing light source malfunctions or does not emit the proper amount of light, the UV curable ink may not completely cure. Uncured UV inks may emit some volatile organic compounds (VOCs). VOCs are considered to have a negative impact on the environment and the end user. Furthermore, if the UV ink is not completely cured, the UV ink that is printed onto the article or object may be wiped off.

SUMMARY

According to aspects illustrated herein, there are provided a print system and a method for detecting and correcting underperforming LEDs in-line of a 3D object printer. One disclosed feature of the embodiments is a print system that comprises a plurality of printheads arranged in a two-dimensional array, wherein each one of the plurality of printheads is configured to eject a marking material, a curing light source coupled to the two-dimensional array of the plurality of printheads, an inline detection and correction (IDC) system coupled to the curing light source, a movable member to hold an object and a test plate, wherein the movable member is positioned parallel to a plane formed by the two-dimensional array of the plurality of printheads, the curing light source and the IDC system and a controller to control movement of the movable member to move the object and the test plate past the array of printheads, to operate the plurality of printheads to eject the marking material onto the object as the object passes the two-dimensional array of printheads, to operate the curing light source apply energy to the test plate and to cure the marking material, and to operate the IDC system to read the test plate to confirm that the curing light source is operating correctly based on a reading of the test plate.

Another disclosed feature of the embodiments is a method for detecting and correcting underperforming LEDs in-line of a 3D object printer. In one embodiment, the method comprises moving a test plate vertically parallel to a plane in front of a curing light source after a two-dimensional array of a plurality of printheads has ejected marking material onto an object, applying energy to the test plate, moving the test plate vertically parallel to the plane in front of an inline detection and correction (IDC) system and determining whether the curing light source is operating correctly based on a reading of the test plate.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses an apparatus and method for detecting and correcting underperforming LEDs in-line of a 3D object printer. As discussed above, some printers use UV curable inks to print on articles and objects. UV curable inks are applied onto the article or object and a UV light source is used to cure the ink. The UV light source may be used to initiate a photochemical reaction that generates a crosslinked network of polymers. In other words, the ink is not simply "dried" where solvent is evaporated from the ink. Rather, the UV ink is cured such that the polymers in the UV ink undergo a chemical reaction to link or bond to the article or object.

A curing light source may be used to applying light to cure the UV curable ink. However, if curing light source malfunctions or does not emit the proper amount of light, the UV curable ink may not completely cure. Uncured UV inks may emit some volatile organic compounds (VOCs). VOCs are considered to have a negative impact on the environment and the end user. Furthermore, if the UV ink is not completely cured, the UV ink that is printed onto the article or object may be wiped off.

Embodiments of the present disclosure provide a novel apparatus and method that provides detection and correction of underperforming LEDs in-line of a 3D printing system. For example, LEDs that are not emitting enough light, or have completely failed, may be detected in-line. The underperforming LED may be corrected by adjusting an intensity of at least one adjacent LED. The apparatus may be part of the 3D object printer and may be in-line to the overall printing process of the 3D object printer.

Figure 1:
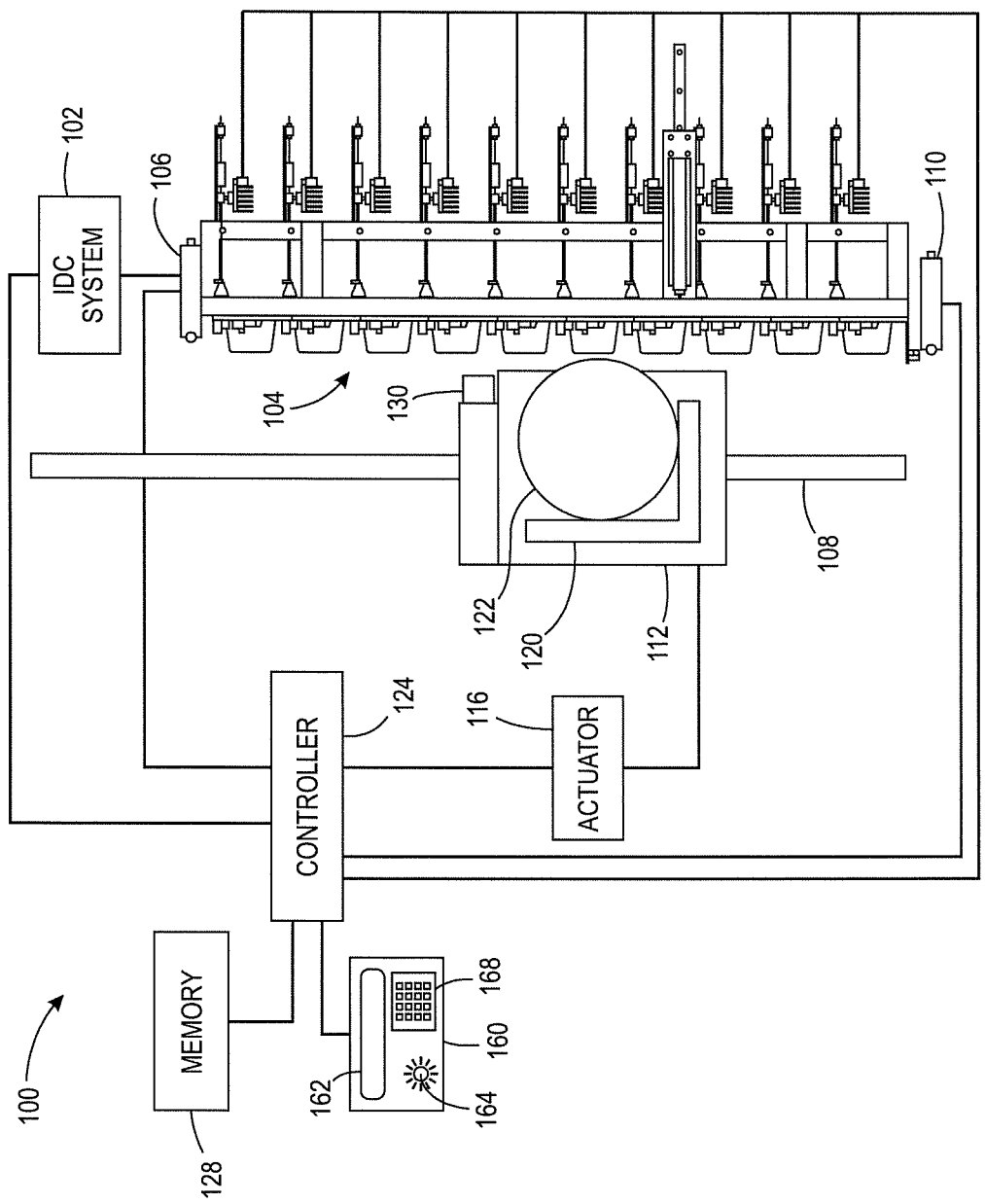
FIG. 1 illustrates an example 3D object printer of the present disclosure.

FIG. 1 illustrates an exemplary printing system 100 configured to print on an object 122. The object 122 may be a three dimensional (3D) object that has an irregular shape. For example, the object 122 may have one or more different curved surfaces with different amounts of curvature. Said another way, the object 122 may not have a flat surface.

In one embodiment, the printing system 100 includes an array, or a plurality, of printheads 104, a support member 108, a member 112 movably mounted to the support member 108, an actuator 116 operatively connected to the movably mounted member 112, an object holder 120 configured to mount to the movably mounted member 112, a test plate 130 and a controller 124 operatively connected to the plurality of printheads and the actuator. As shown in FIG. 1, the array of printheads 104 is arranged in a two-dimensional array, which in the figure is a 10×1 array, although other array configurations can be used. Each printhead is fluidly connected to a supply of marking material (not shown) and is configured to eject marking material received from the supply. Some of the printheads can be connected to the same supply or each printhead can be connected to its own supply so each printhead can eject a different marking material.

In one embodiment, the marking material may be an ultra violet (UV) ink. The marking material may be cured by a curing light source 106. The curing light source 106 may be positioned to cure the marking material after the marking material is ejected by the array of printheads 104. For example, the curing light source 106 may be positioned vertically above or below the array of printheads 104 depending on which direction printing occurs along the support member 108. Said another way, the curing light source 106 may be stacked above or below the array of printheads 104 along a plane formed by the array of printheads 104.

In one embodiment, the controller 124 may also be operatively coupled to the curing light source 106 to control an amount and a duration of light applied to the marking material for curing. In other words, the curing light source 106 may be used to initiate a photochemical reaction that generates a crosslinked network of polymers. In other words, the ink is not simply "dried" where solvent is evaporated from the ink. Rather, the marking material (e.g., the UV ink) is cured such that the polymers in the marking material undergo a chemical reaction to link or bond to the object 122.

In one embodiment, the curing light source 106 may be a two dimensional array of light emitting diodes (LEDs). The LEDs may be UV emitting LEDs that can cure the marking material. Each one of the LEDs may be independently addressable. In other words, the luminosity or light intensity of each LED within the two dimensional array of LEDs may be controlled independent of the other LEDs.

In one embodiment, the controller 124 may also control the actuator 116 to move the test plate 130 coupled to the member 112 in front of the curing light source 106. In one embodiment, the test plate 130 may be a conductive metal. The test plate 130 may absorb energy from the UV light emitted from the curing light source 106.

In one embodiment, after the test plate 130 absorbs energy from the UV light emitted from the curing light source 106, the test plate 130 may be moved in front of an inline detection and correction (IDC) system 102. The IDC system 102 may be positioned to confirm that the curing light source 106 is operating correctly. In other words, operating correctly may be defined as having a light intensity pattern that is within a predefined threshold of matching a predefined light intensity pattern.

In one embodiment, the IDC system 102 may be positioned vertically above or below the curing light source 106 and the array of printheads 104 depending on which direction printing occurs along the support member 108. Said another way, the IDC system 102 may be stacked directly above or below the curing light source 106 along the plane formed by the array of printheads 104.

As noted above, the marking material may be cured via the curing light source 106. However, insufficient curing can cause harmful volatile organic compounds (VOCs) to be emitted from the marking material. The IDC system 102 may confirm that the curing light source 106 has a proper light intensity profile to ensure that all marking material is properly cured. For example, if an LED in a portion of the curing light source 106 were to fail, or operate at a non-optimal intensity, the marking material on the corresponding portion of the object 122 would not cure completely.

The controller 124 may be operatively coupled to the IDC system 102. If the IDC system 102 confirms that the curing light source 106 is operating correctly, the printing process may end. However, if the IDC system 102 determines that the curing light source 106 is not operating correctly, the controller 124 may control the actuator 116 to move test plate 130 coupled to the member 112 back in front of the curing light source 106 for additional testing. A more detailed diagram and description of the IDC system 102 is provided below.

In one embodiment, the IDC system 102 may determine that the curing light source 106 is operating correctly based on a thermal profile of the test plate 130. For example, a correctly operating curing light source that is known to have all LEDs operating at a correct intensity may be tested with the test plate 130. A thermal profile associated with the correctly operating curing light source may be recorded as a predefined thermal profile.

Figure 2:
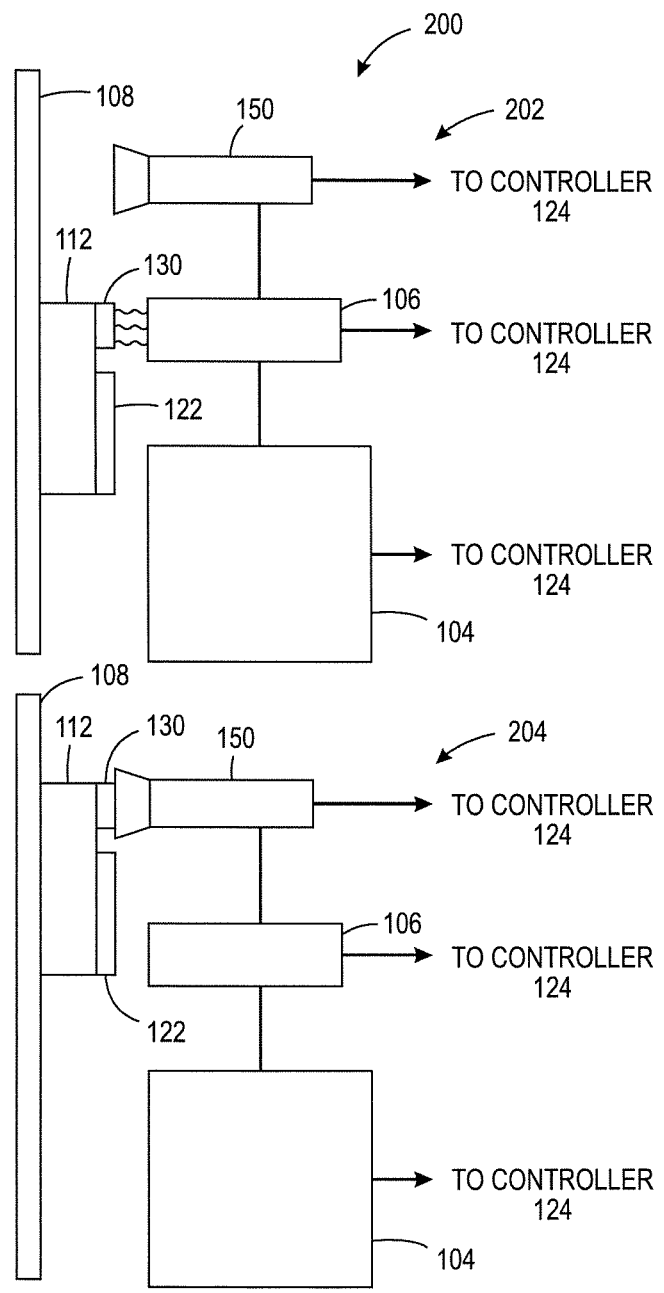
FIG. 2 illustrates an example process flow block diagram of detecting and correcting underperforming LEDs.

FIG. 2 illustrates an example process flow diagram of detecting and correcting underperforming LEDs in the curing light source 106. For example at block 202, during operation of the print system 100, the curing light source 106 may apply energy to the test plate 130.

At block 204, the IDC system 102 may read the test plate 130. The thermal profile of curing light source 106 may be generated by the IDC system 102 based on a reading of the test plate 130. For example, in one embodiment, the IDC system 102 may include an infrared (IR) camera 150. The IR camera 150 may capture thermal imaging of the test plate 130. Each thermal image reading may be associated with a light intensity of an area of the curing light source 106. The light intensity values may be plotted across a width of the curing light source 106 to generate the thermal profile of the current light source 106.

In one embodiment, a thermal profile may be generated for each horizontal line of the LEDs across a width of the two-dimensional LED array of the curing light source 106. For example, if the current light source 106 had four rows of LEDs, the IDC system 102 may create four thermal profiles (e.g., one thermal profile for each one of the four rows of LEDs) that are each compared to the predefined thermal profile.

The thermal profile of the curing light source 106 may be compared to the predefined thermal profile of the correctly operating curing light source. A predefined operating range may be used to define an acceptable upper limit and an acceptable lower limit around the predefined thermal profile. If any point across the thermal profile of the curing light source 106 falls outside of the predefined operating range when compared to the predefined thermal profile of the correctly operating curing light source, the curing light source 106 may be determined to not be operating correctly.

Figure 3:
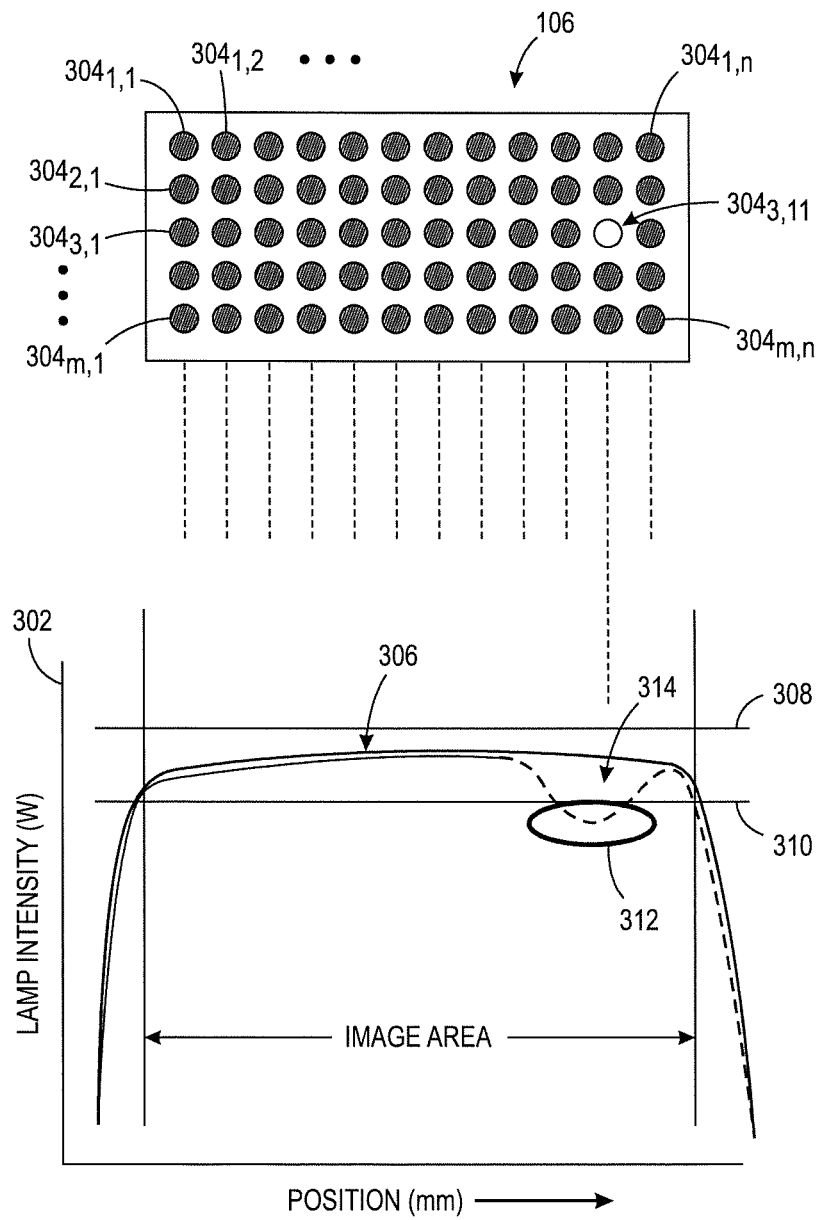
FIG. 3 illustrates an example LED array with a failed LED and a corresponding thermal profile.

FIG. 3 illustrates an example of a thermal profile 302. FIG. 3 illustrates the curing light source 106 having a plurality of LEDs $304_{1,1}$ to $304_{m,n}$ (also referred to collectively as LEDs 304). In other words, the curing light source 106 may have m rows of n LEDs. In one embodiment, the thermal profile 302 may correspond to row 3 of the two-dimensional array of LEDs 304.

As noted above, the IDC system 102 may plot the intensity values of the row 3 of the LEDs 304 of the curing light source 106 as illustrated by a dashed line 310. The predefined thermal profile of a correctly operating curing light source may be illustrated by a solid line 306. An upper limit of a predefined range may be provided by a line 308 and a lower limit of the predefined range may be provided by a line 310.

In the example illustrated in FIG. 3, the LED $304_{3,\,11}$ may be underperforming. Underperforming may be defined as emitting a light intensity or luminosity below a desired amount or threshold or failing (e.g., the LED emits no light and does not operate at all). The test plate 130 may have a reading that corresponds to the location of the LED$_{3,\,11}$ that is plotted as a value that falls below the lower limit 310 as highlighted by a circle 312. As a result, the IDC system 102 may determine that the cure light source 106 is not operating correctly.

In response to determining that the curing light source 106 is not operating correctly, a correction may be applied to the curing light source 106. For example, the IDC system 102 may send a signal to the controller 124 that the curing light source 106 is not operating correctly. The controller 124 may then apply the correction.

Figure 4:
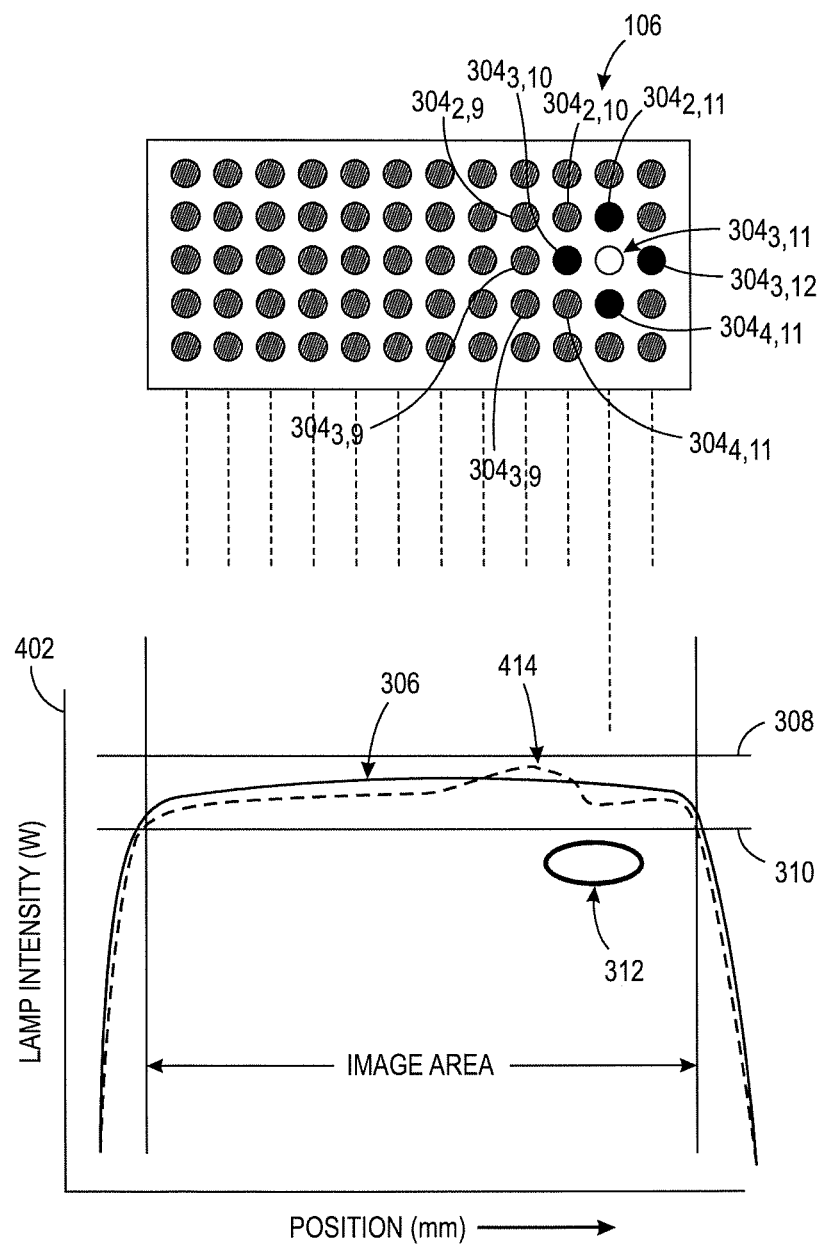
FIG. 4 illustrates an example LED array that is corrected for the failed LED and a corresponding thermal profile.

As discussed above, each one of the LEDs 304 may be independent addressable. As a result, the controller 124 may adjust an intensity of at least one LED 304 that is adjacent to the underperforming, or failed, LED $304_{3,\,11}$. FIG. 4 illustrates an example, where adjacent LEDs $304_{2,\,11}$, $304_{3,\,10}$, $304_{3,\,12}$ and/or $304_{4,\,11}$ may be adjusted. In one embodiment, the adjustment may be to increase the intensity of one or more of the adjacent LEDs $304_{2,\,11}$, $304_{3,\,10}$, $304_{3,\,12}$ and/or $304_{4,\,11}$. For example, the LEDs 304 may initially operate at light output that is lower than a maximum light output of the LEDs 304. As a result, if one of the LEDs 304 fails, then the other LEDs 304 may have the capability to increase the amount of light output (e.g., the intensity or luminosity) to perform the correction.

After the correction is applied the controller 124 may control the actuator 116 to move the test plate 130 coupled to the member 112 back in front of the curing light source 106. The curing light source 106 may apply energy to the test plate 130. The test plate 130 may be moved in front of the IDC system 102 again and the test plate 130 may be read by the IR camera 150 of the IDC system 102 again. The IDC system 102 may generate the thermal profile 402 of the corrected curing light source 106. For example, the light intensity across the third row of the LEDs 304 may be plotted as shown by dashed line 414. Notably, all areas across a width of the curing light source 106 as shown by the dashed line 414 falls within the upper limit 308 and the lower limit 310 of the predefined thermal profile illustrated by the solid line 306. In other words, the dashed lines that fell within the circle 312 in FIG. 3 are no longer present in the circle 312. Therefore, the IDC system 102 may determine that the curing light source 106 is operating correctly.

However, in some instances, the adjustment to the at least one adjacent LEDs $304_{2,\,11}$, $304_{3,\,10}$, $304_{3,\,12}$ and/or $304_{4,\,11}$ have a caused the thermal profile to increase above the upper limit 308. As a result, in some embodiments, additional one or more second LEDs adjacent to the at least one adjacent LEDs $304_{2,11}$, $304_{3,10}$, $304_{3,12}$ and/or $304_{4,11}$ may also be adjusted. For example, if the intensity of the LED $304_{3,10}$ was increased to correct the underperforming LED $304_{3,11}$, one or more of the LEDs $304_{2,9}$, $304_{2,10}$, $304_{3,9}$, $304_{4,9}$, and/or $304_{4,10}$ may have the light intensity decreased. The process may be repeated until the IDC system 102 determines that the curing light source 106 is operating correctly.

In one embodiment, the amount of adjustment may be predefined. For example, the adjustment may be an increase of 10% of the original light intensity. In one embodiment, the amount of adjustment to increase the intensity and decrease the intensity may be the same.

In another embodiment, the amount of adjustment to increase the intensity and decrease the intensity may be different. For example, the amount to increase may be 10% of the original light intensity and the amount to decrease may be 1% of the original light intensity.

In one embodiment, the IDC system 102 may determine whether the curing light source 106 is operating correctly in-line during the printing process of the object 122. In other words, the marking material is ejected onto the object 122 and the curing light source 106 applies energy to the test plate 130 and then the marking material. The test plate 130 may then be read by the IR camera 150 of the IDC system 102, as described above.

In one embodiment, the IDC system 102 may determine whether the curing light source 106 is operating correctly before the printing process begins. For example, after the object 122 is loaded into the printing system 100 the printing process is initiated, the controller 124 may not start the printing process until the IDC system 102 confirms that the curing light source 106 is operating correctly.

Referring back to FIG. 1, in one embodiment, the support member 108 is positioned to be parallel to the plane formed by the array of printheads and, as shown in FIG. 1, is oriented so one end of the support member 108 is at a higher gravitational potential than the other end of the support member 108. This orientation enables the printing system 100 to have a smaller footprint than an alternative embodiment that horizontally orients the two-dimensional array of printheads and configures the support member, the member, and the object holder to enable the object holder to pass objects past the horizontally arranged printheads so the printheads can eject marking material downwardly on the objects.

The member 112 is movably mounted to the support member 108 to enable the member to slide along the support member 108. In some embodiments, the member 112 can move bi-directionally along the support member 108. In other embodiments, the support member 108 is configured to provide a return path to the lower end of the support member 108 to form a track for the member 112. The actuator 116 is operatively connected to the member 112 so that the actuator 116 can move the member 112 along the support member 108 and enable the object holder 120 connected to the member 112 to pass the two-dimensional array of the plurality of printheads 104 in one dimension of the two-dimensional array of printheads 104.

In the embodiment, the object holder 120 moves the object 122 along a length dimension of the array of printheads 104. The object holder 120 may have different shapes and sizes depending on a shape and size of the object 122. For example, different object holders 120 may be coupled to the member 112 for different objects 122. The object holder 120 may be custom built for each different type of object 122 that is used in the printing system 100.

In one embodiment, the printing system 100 may include an optical sensor 110. The optical sensor 110 may be a scanner to scan a stock keeping unit (SKU) or barcode on the object 122. The SKU may provide information to the controller 124 with regards to how to control the array of printheads 104 to print an image onto the surface of the object 122. For example, different shaped objects 122 may have different printing profiles that may be included into the SKU.

In one embodiment, the optical sensor 110 may be a scanner that can scan the object 122 to determine a profile of the object 122. For example, the printing system 100 may determine a printing profile on-the-fly using the optical sensor 110. The surface profile scanned by the optical sensor 110 may be transmitted to the controller 124. The controller 124 may then calculate a sequence of operation of the printheads of the array of printheads 104 and an amount of marking material to eject from each printhead.

In one embodiment, the controller 124 is configured with programmed instructions stored in a memory 128 operatively connected to the controller so the controller can execute the programmed instructions to operate components in the printing system 100. Thus, the controller 124 is configured to operate the actuator 116 to move the object holder 120 past the array of printheads 104 and to operate the array of printheads 104 to eject marking material onto the object 122 held by the object holder 120 as the object holder 120 passes the array of printheads 104.

In one embodiment, the controller 124 may also be operatively coupled to an interface 160. The interface 160 may include a display 162, an annunciator 364 and an input device 168, such as a keypad. The interface 160 may be used to notify an operator if a printing program for a particular SKU is not available, display error messages, completion messages, and the like, on the display 162. The annunciator 164 may provide a warning light or an audible alarm to attract attention to messages on the display 162 or to indicate an error has occurred.

Additionally, the controller 124 is configured to operate the inkjets within the printheads of the array of printheads 104 so they eject drops with larger masses than the masses of drops ejected from such printheads. In one embodiment, the controller 124 operates the inkjets in the printheads of the array of printheads 104 with firing signal waveforms that enable the inkjets to eject drops that produce drops on surfaces of the object 122 having a diameter of about seven to about ten millimeters (mm). This drop size is appreciably larger than the drops that produced drops on the material receiving surface having a mass of about 21 nanograms (ng).

It should be noted that the orientation of the components of the printing system 100 is provided as an example. For example, FIG. 1 illustrates the printing process moved vertically upwards from the bottom of the page towards the top of the page. However, it should be noted that the components may be flipped such that the printing process may move vertically downwards from the top of the page to the bottom of the page.

The system configuration shown in FIG. 1 is especially advantageous in a number of aspects. For one, as noted above, the vertical configuration of the array of printheads 104 and the support member 108 enables the printing system 100 to have a smaller footprint than a system configured with a horizontal orientation of the array and support member. This smaller footprint of the printing system 100 enables the printing system 100 to be housed in a single cabinet and installed in non-production outlets. Once installed, various object holders can be used with the system to print a variety of goods that are generic in appearance until printed.

Another advantageous aspect of the printing system 100 shown in FIG. 1 is the gap presented between the objects 122 carried by the object holder 120 and the printheads of the array of printheads 104. The gap in this embodiment is in a range of about five to about six mm. Heretofore, the gap was maintained in a range centered about 1 mm. This smaller gap was thought to ensure a more accurate placement of drops from an ejecting printhead. It has been discovered that the greater gap width reduces the effect of laminar air flow in the gap between the printheads and the surface receiving the marking material drops so the accuracy of drop placement, especially for larger 3D objects, is maintained. This effect is particularly effective with the larger drop sizes noted previously. Without the turbulence produced by the movement of an object in close proximity to a printhead, the momentum of the ejected drops is adequate to keep the drops on their projected course so the registration of the drops from different printheads can be preserved for maintaining image quality. Additionally, the controller 124 can be configured with programmed instructions to operate the actuator 116 to move the object holder 120 at speeds that attenuate the air turbulence in the larger gap between the printhead and the surface of the object 122 used in the printing system 100.

Figure 5:
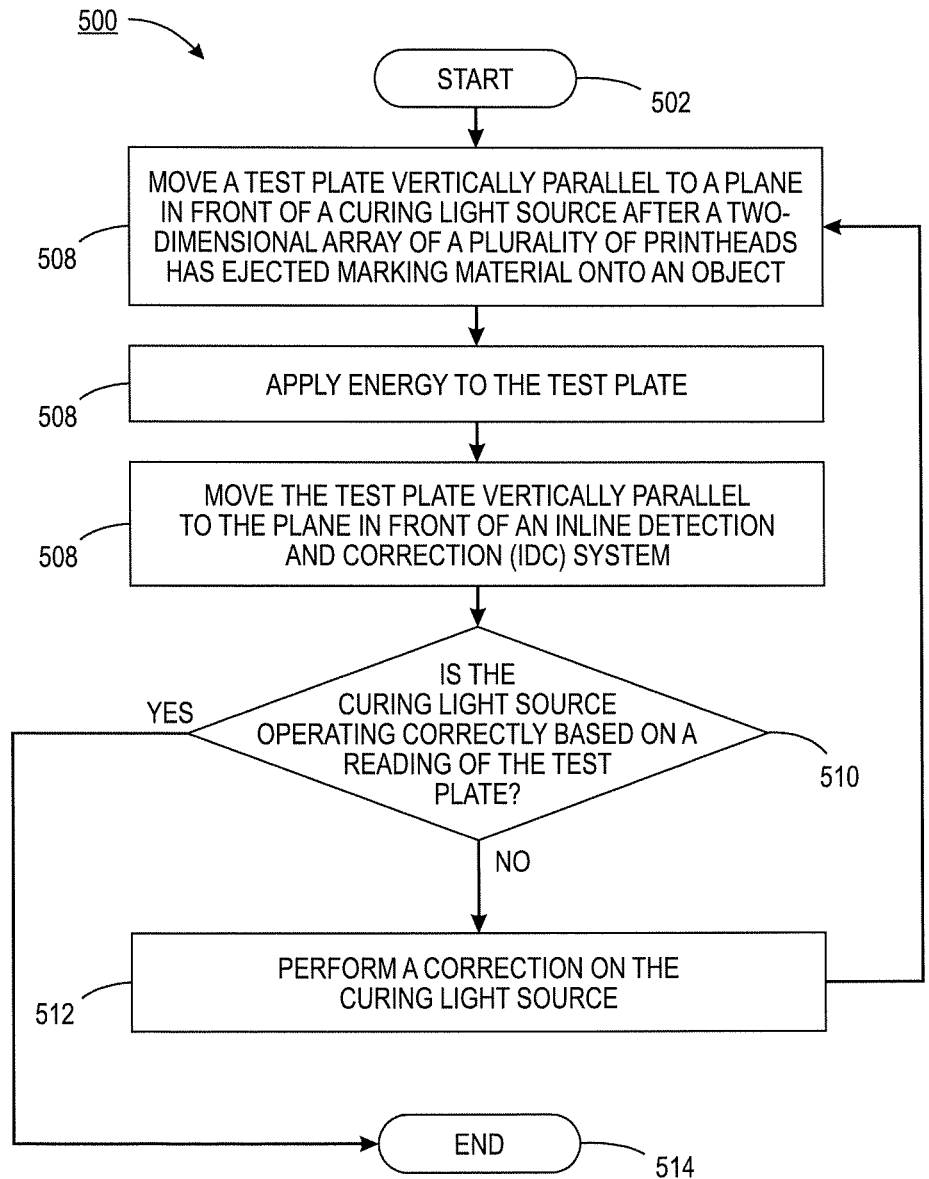
FIG. 5 illustrates a flowchart of an example method for detecting and correcting underperforming LEDs.
Figure 6:
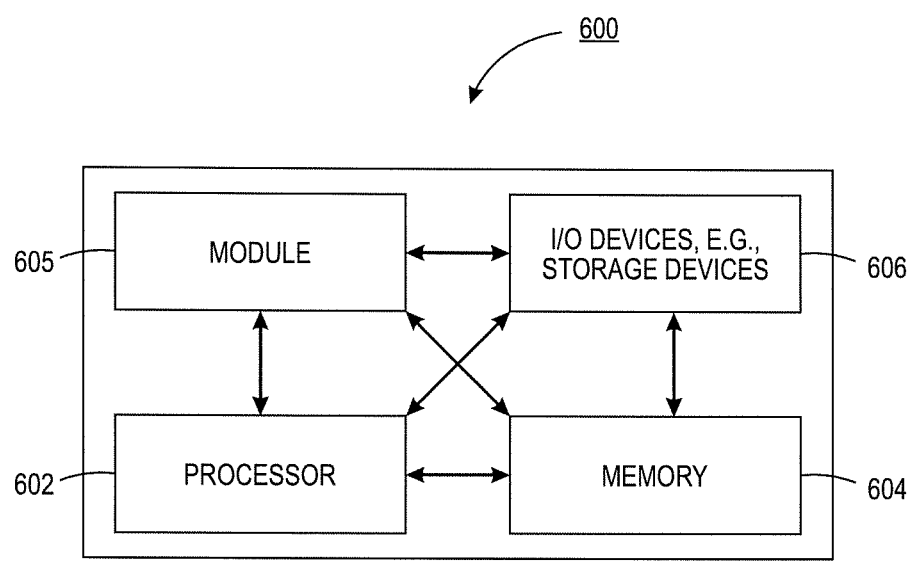
FIG. 6 illustrates a high-level block diagram of a computer suitable for use in performing the functions described herein.

FIG. 5 illustrates a flowchart of an example method 500 for detecting and correcting underperforming LEDs in-line of a 3D object printer. In one embodiment, one or more steps or operations of the method 500 may be performed by the printing system 100 or a computer that controls operation of the printing system 100 as illustrated in FIG. 6 and discussed below.

At block 502, the method 500 begins. At block 504, the method 500 moves a test plate vertically parallel to a plane in front of a curing light source after a two-dimensional array of a plurality of printheads has ejected marking material onto an object. In one embodiment, the test plate may be moved during a printing process (e.g., the testing of the curing light source may be performed in-line). In another embodiment, the test plate may be moved before a printing process begins. In one embodiment, the plane may be an imaginary surface to which each one of the plurality of printheads may be aligned. The test plate may move parallel to this plane vertically up and down.

At block 506, the method 500 applies energy to the test plate. For example, the curing light source may emit light that is used to apply energy to the test plate. The test plate may be a conductive metal. The curing light source may comprise a plurality of UV emitting LEDs. The energy from the UV emitting LEDs may be absorbed by the test plate causing the test plate to become heated.

In one embodiment, the curing light source may be turned on to emit energy from the UV emitting LEDs for a predefined time period. For example, the predefined time period may be an amount of time that the curing light source would be turned on to cure the marking material that is ejected onto the object during a printing process. In another embodiment, the predefined time period may be any amount of time that is the same as the amount of time the curing light source was turned on for a pre-defined thermal image, as discussed above.

At block 508, the method 500 moves the test plate vertically parallel to the plane in front of an inline detection and correction (IDC) system. In one embodiment, after the energy is applied to the test plate, the test plate may be moved into a position such that an IR camera of the IDC system may read the test plate. The thermal IR camera may read a temperature of each point, or location, across the test plate to create a two dimensional (2D) thermal image. The 2D thermal image may have different colors, or shades of colors, associated with different temperatures or energy readings. Each temperature reading, color or shade of color may be associated with a light intensity of an LED of the curing light source. The light intensity values may be plotted for each location across a width of the test plate to generate a thermal profile of the curing light source. In one embodiment, a thermal profile may be created for each row, or single array, of LEDs of the 2D array of LEDs of the curing light source.

At block 510, the method 500 determines if the curing light source is operating correctly based on a reading of the test plate. In one embodiment, the thermal profile for each row of LEDs may be compared to a pre-defined thermal profile of a correctly operating curing light source. The pre-defined thermal profile may include a pre-defined range that includes an upper limit and a lower limit of acceptable intensity values. If any point of the thermal profile of the curing light source falls outside of the pre-defined range when compared against the pre-defined thermal profile, then the curing light source may be not be operating correctly (e.g., see FIG. 3). However, if all of the points of the thermal profile of the curing light source fall within the pre-defined range when compared against the pre-defined thermal profile, then the curing light source may be operating correctly (e.g., see FIG. 4).

In one embodiment, each intensity value at a position across a width of the thermal profile may be associated with a particular LED in the corresponding position within the row of LEDs of the curing light source. As a result, if any points fall outside of the pre-defined range when compared against the per-defined thermal profile, then the exact LED that has failed or is underperforming may be identified.

If the method 500 determines that the curing light source is operating correctly, the method 500 may proceed to block 514. At block 514, the method 500 ends. However, if the method 500 determines that the curing light source is not operating correctly, the method 500 ay proceed to block 512.

At block 512, the method 500 performs a correction on the curing light source. In one embodiment, at least one adjacent LED to the failed or underperforming LED detected in block 510 may be adjusted. In one embodiment, an intensity may be increased for the one or more adjacent LEDs to the failed or underperforming LED.

In one embodiment, one or more second LEDs that are adjacent to the at least one adjacent LED of the failed or underperforming LED may also be adjusted. For example, if the intensity of an adjacent LED is increased, a second LED adjacent to the adjacent LED (e.g., but not adjacent to the failed or underperforming LED) may be adjusted to decrease an intensity. As a result, the average of the adjustments will allow the intensity values to fall within the predefined range of the predefined thermal profile.

In one embodiment, the adjustment may be by a pre-defined amount. For example, the intensity of an LED may be increased by 10% of an initial intensity. In one embodiment, the adjustment to increase the intensity and the adjustment to decrease the intensity may be the same. In another embodiment, the adjustment to increase the intensity and the adjustment to decrease the intensity may be different. For example, the intensity of a first LED may be increased by 10% of an initial intensity and the intensity for another LED may be decreased by 1% of an initial intensity.

After the adjustment is performed in block 512, the method 500 may return to block 504 and blocks 504-510 may be repeated until the curing light source is operating correctly. Once the light source is operating correctly, the method 500 may proceed to block 514. At block 514, the method 500 ends.

It should be noted that the blocks in FIG. 5 that recite a determining operation or involve a decision do not necessarily require that both branches of the determining operation be practiced. In other words, one of the branches of the determining operation can be deemed as an optional step. In addition, one or more steps, blocks, functions or operations of the above described method 500 may comprise optional steps, or can be combined, separated, and/or performed in a different order from that described above, without departing from the example embodiments of the present disclosure.

FIG. 6 depicts a high-level block diagram of a computer that is dedicated to perform the functions described herein. As depicted in FIG. 6, the computer 600 comprises one or more hardware processor elements 602 (e.g., a central processing unit (CPU), a microprocessor, or a multi-core processor), a memory 604, e.g., random access memory (RAM) and/or read only memory (ROM), a module 605 for detecting and correcting underperforming LEDs in-line of a 3D object printer, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 605 for detecting and correcting underperforming LEDs in-line of a 3D object printer (e.g., a software program comprising computer-executable instructions) can be loaded into memory 604 and executed by hardware processor element 602 to implement the steps, functions or operations as discussed above in connection with the example method 500. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for detecting and correcting underperforming LEDs in-line of a 3D object printer (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for detecting and correcting underperforming light emitting diodes (LEDs) in-line of a 3D object printer, comprising:

scanning a stock keeping unit (SKU) on an object via an optical sensor of the 3D object printer to determine how to control a two-dimensional array of a plurality of printheads to print an image onto the object;

moving the object vertically above the optical sensor in front of the two-dimensional array of the plurality of printheads, wherein the object is positioned to create a gap of 5 to 6 mm between the object and the two-dimensional array of the plurality of printheads;

printing ultra violet (UV) ink onto the object based on the SKU that is scanned and a test plate, wherein the UV ink is ejected by the two-dimensional array of the plurality of printheads arranged vertically in drops having a diameter of 7 to 10 millimeters and wherein the object and the test plate are moved vertically up and down between the plurality of printheads by a movable member comprising an object holder that holds the object;

moving the test plate vertically parallel to a plane in front of a curing light source via the movable member, wherein the curing light source is positioned vertically above the two-dimensional array of the plurality of printheads and comprises a two-dimensional array of LEDs;

applying energy to the test plate;

moving the test plate vertically parallel to the plane in front of an inline detection and correction (IDC) system;

determining that the curing light source is operating incorrectly based on a reading of the test plate, wherein the determining comprises:

capturing a thermal image of the test plate;

plotting a thermal profile for each horizontal row of the thermal image of the test plate; and comparing the thermal profile for each horizontal row of the thermal image of the test plate to a pre-defined thermal profile associated with a corresponding horizontal row associated with a correctly operating curing light source; and identifying a location of at least one LED in a horizontal row of the two-dimensional array of LEDs of the curing light source that is underperforming that is causing the curing light source to operate incorrectly based on the thermal profile.

2. The method of claim 1, wherein the determining comprises:

detecting that the at least one LED of the curing light source has failed, when the thermal profile for one horizontal row of the thermal image is outside of a predefined range of the pre-defined thermal profile associated with the corresponding horizontal row.

3. The method of claim 2, further comprising:

correcting operation of the curing light source when the at least one LED of the curing light source has failed.

4. The method of claim 3, wherein the correcting, comprises:

adjusting an intensity of at least one adjacent LED.

5. The method of claim 4, wherein the moving the test plate vertically parallel to the plane in front of the curing light source, the applying the energy to the test plate, the moving the test plate vertically parallel to the plane in front of the IDC system, the determining, the identifying, the correcting, and the adjusting are repeated until the curing light source is determined to be operating correctly.

6. The method of claim 4, wherein the adjusting comprises increasing an intensity of the at least one adjacent LED by a pre-defined amount.

7. The method of claim 4, wherein the adjusting comprises:

increasing an intensity of the at least one adjacent LED by a pre-defined amount; and decreasing an intensity of at least one second LED that is adjacent to the at least one adjacent LED by a pre-defined amount.

8. The method of claim 1, wherein the test plate comprises a conductive metal.

9. The method of claim 1, wherein the two-dimensional array of LEDs comprises UV light emitting diodes (LEDs), wherein each one of the UV LEDs of the two-dimensional array is independently addressable.

* * * * *